(12) United States Patent
Liu et al.

(10) Patent No.: US 11,015,018 B2
(45) Date of Patent: May 25, 2021

(54) RESIN COMPOSITION AND METHOD FOR MANUFACTURING THERMALLY CONDUCTIVE MATERIAL

(71) Applicant: INDUSTRIAL TECHNOLOGY RESEARCH INSTITUTE, Hsinchu (TW)

(72) Inventors: Yen-Chun Liu, Taipei (TW);
Min-Chian Wang, New Taipei (TW);
Hsiang-Yen Tsao, New Taipei (TW);
Kuo-Chan Chiou, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/146,084

(22) Filed: Sep. 28, 2018

(65) Prior Publication Data
US 2019/0211138 A1 Jul. 11, 2019

(30) Foreign Application Priority Data
Jan. 8, 2018 (TW) ................ 107100633

(51) Int. Cl.
| *C08G 59/52* | (2006.01) |
| *C08G 59/50* | (2006.01) |
| *C08K 3/22* | (2006.01) |
| *C08G 59/22* | (2006.01) |
| *C08G 59/24* | (2006.01) |
| *C08G 59/56* | (2006.01) |
| *C09D 163/00* | (2006.01) |
| *C09K 5/14* | (2006.01) |
| *C08L 63/00* | (2006.01) |
| *C08K 3/08* | (2006.01) |
| *C08K 3/013* | (2018.01) |

(52) U.S. Cl.
CPC .......... *C08G 59/22* (2013.01); *C08G 59/226* (2013.01); *C08G 59/24* (2013.01); *C08G 59/245* (2013.01); *C08G 59/504* (2013.01); *C08G 59/5026* (2013.01); *C08G 59/5033* (2013.01); *C08G 59/52* (2013.01); *C08G 59/56* (2013.01); *C08K 3/22* (2013.01); *C08L 63/00* (2013.01); *C09D 163/00* (2013.01); *C09K 5/14* (2013.01); *C08K 3/08* (2013.01); *C08K 2003/2227* (2013.01); *C08K 2201/001* (2013.01)

(58) Field of Classification Search
CPC .... C08G 59/226; C08G 59/24; C08G 59/245; C08G 59/5026; C08G 59/5033; C08G 59/52; C08G 59/56; C08G 59/504; C08K 3/22; C08K 2201/001; C08K 2003/2227; C08K 3/08; C09D 163/00; C09K 5/14; C08L 63/00

USPC .......................................................... 523/400
See application file for complete search history.

(56) References Cited

U.S. PATENT DOCUMENTS

| 4,283,521 | A | 8/1981 | Jones |
| 6,060,539 | A | 5/2000 | Hermansen et al. |
| 7,022,410 | B2 | 4/2006 | Tonapi et al. |
| 7,109,288 | B2 | 9/2006 | Akatsuka et al. |
| 7,297,399 | B2 | 11/2007 | Zhang et al. |
| 7,405,246 | B2 | 7/2008 | Rubinsztajn |
| 7,550,097 | B2 | 6/2009 | Tonapi et al. |
| 7,662,307 | B2 | 2/2010 | Chiou et al. |
| 7,797,808 | B2 | 9/2010 | Zhang et al. |
| 8,530,566 | B2 | 9/2013 | Lin et al. |
| 9,296,916 | B2 | 3/2016 | Peters et al. |
| 9,371,233 | B2 | 6/2016 | Lin et al. |
| 9,441,069 | B2 | 9/2016 | Arita et al. |
| 9,643,221 | B2 | 5/2017 | Eda et al. |
| 2004/0224163 | A1 | 11/2004 | Tobita et al. |
| 2005/0049352 | A1 | 3/2005 | Rubinsztajn et al. |
| 2005/0170188 | A1 | 8/2005 | Campbell et al. |
| 2006/0275608 | A1 | 12/2006 | Tonapi et al. |
| 2006/0293172 | A1 | 12/2006 | Rubinsztajn et al. |
| 2017/0096577 | A1 | 4/2017 | Abrami et al. |
| 2017/0145247 | A1 | 5/2017 | Ho et al. |
| 2017/0158932 | A1 | 6/2017 | Liu et al. |
| 2017/0158934 | A1 | 6/2017 | Liu et al. |

FOREIGN PATENT DOCUMENTS

| CN | 102858837 A | 1/2013 |
| JP | S62-89720 A | 4/1987 |
| JP | H3-72522 A | 3/1991 |
| JP | H4-185630 A | 7/1992 |
| JP | 2003-147046 A | 5/2003 |
| JP | 2004-27005 A | 1/2004 |
| JP | 2004-111501 A | 4/2004 |
| JP | 2017-101237 A | 6/2017 |
| TW | 200533714 A | 10/2005 |
| TW | 201431900 A | 8/2014 |

(Continued)

OTHER PUBLICATIONS

Office Action issued in Taiwan Patent Application No. 107127273 dated Mar. 6, 2018.

(Continued)

*Primary Examiner* — David T Karst
(74) *Attorney, Agent, or Firm* — Birch, Stewart, Kolasch & Birch, LLP

(57) ABSTRACT

A method for manufacturing a thermally conductive material is provided, which includes mixing 1 part by mole of (a) aromatic epoxy resin monomer, 0.25 to 1 part by mole of (b) cycloaliphatic epoxy resin monomer, and 1 to 9 parts by mole of (c) aliphatic epoxy resin monomer to form a resin composition. The method also includes heating and curing the resin composition to form a thermally conductive material.

10 Claims, No Drawings

(56) References Cited

FOREIGN PATENT DOCUMENTS

| TW | I475103 B | 3/2015 |
| WO | WO 2015/005211 A1 | 1/2015 |
| WO | WO 2017/191801 A1 | 11/2017 |

OTHER PUBLICATIONS

Japanese Office Action for Application No. 2019-000418 dated Mar. 3, 2020 w/ English translation.

RESIN COMPOSITION AND METHOD FOR MANUFACTURING THERMALLY CONDUCTIVE MATERIAL

CROSS REFERENCE TO RELATED APPLICATIONS

The present application is based on, and claims priority from, Taiwan Application Serial Number 107100633, filed on Jan. 8, 2018, the disclosure of which is hereby incorporated by reference herein in its entirety.

TECHNICAL FIELD

The technical field relates to a thermally conductive material.

BACKGROUND

Electronic products are increasingly being designed to be thinner than previous models, as well as to use high power so that they may operate in 5th generation wireless systems and internet of things (IoT) applications. To these ends, thermal interface materials play a critical role in integrated module design. Such thermal interface materials should have thermal conductivity so that they can efficiently increase the heat transfer between devices and heat sinks.

The main resin compositions used in conventional thermal interface materials are siloxane resin. A high thermally conductive filler (e.g. a ceramic filler such as alumina or boron oxide) is added to the siloxane resin to increase heat transfer efficiency, and the mixture is then shaped into a sheet, a pad, a belt, or a film. The amount of thermally conductive filler introduced into the siloxane resin is often greater than 85 wt % of the total weight for a higher heat transfer efficiency of the thermal interface material. More thermally conductive filler results in higher heat transfer efficiency. However, the properties of the resin composition are difficult to appear due to the high filler amount. For example, the conventional thermal interface materials have problems such as poor electrical insulation, insufficient softness, insufficient mechanical strength, and insufficient thermal resistance. The main problem limiting their application is that the thermal interface materials cannot be roll coated, which is only processed by hot pressing to greatly limit their application.

A thermally conductive, electrically insulating, and coatable resin composition is called to overcome the problems of the thermally conductive filler those are overly added (e.g. low electrical insulation and mechanical strength of the thermal interface material).

SUMMARY

One embodiment of the disclosure provides a resin composition, including: 1 part by mole of (a) aromatic epoxy resin monomer; 0.25 to 1 part by mole of (b) cycloaliphatic epoxy resin monomer; and 1 to 9 parts by mole of (c) aliphatic epoxy resin monomer.

One embodiment of the disclosure provides a method for manufacturing a thermally conductive material, including: mixing 1 part by mole of (a) aromatic epoxy resin monomer, 0.25 to 1 part by mole of (b) cycloaliphatic epoxy resin monomer; and 1 to 9 parts by mole of (c) aliphatic epoxy resin monomer to form a resin composition; and heating and curing the resin composition to form a thermally conductive material.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a resin composition, which includes 1 part by mole of (a) aromatic epoxy resin monomer, 0.25 to 1 part by mole of (b) cycloaliphatic epoxy resin monomer, and 1 to 9 parts by mole of (c) aliphatic epoxy resin monomer. The amount of (b) cycloaliphatic epoxy resin monomer that is too high results in a poor heat transfer coefficient of the cured resin composition. The amount of (b) cycloaliphatic epoxy resin monomer that is too low may reduce the compatibility of the resin composition. The amount of (c) aliphatic epoxy resin monomer that is too high may degrade the mechanical properties and lower the heat transfer coefficient of the cured resin composition. The amount of (c) aliphatic epoxy resin monomer that is too low may reduce the softness of the resin composition.

In one embodiment, (a) aromatic epoxy resin monomer has a chemical structure of

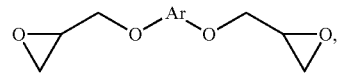

wherein Ar is

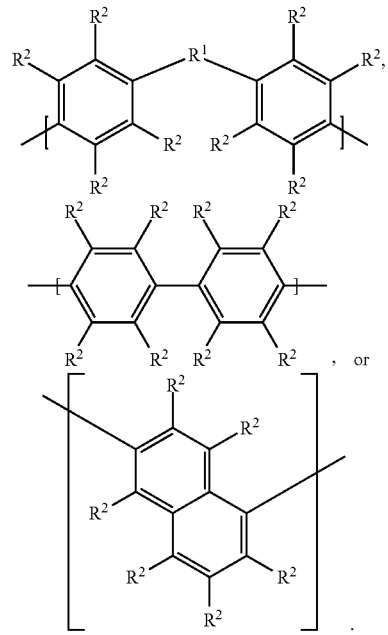

$R^1$ is —$CH_2$—, —$C(CH_3)_2$—, —CH=CH—, —CH=C($CH_3$)—, —O—, —C≡C—, —C=CH—CO—, —COO—, —CONH—, or —CO—. Each of $R^2$ is independently H, halogen, or $C_{1-8}$ alkyl group. In one embodiment, (a) aromatic epoxy resin monomer has a structure of

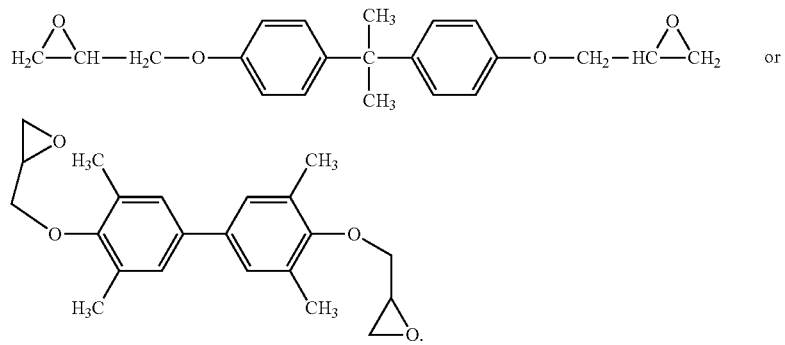

In one embodiment, (b) cycloaliphatic epoxy resin monomer has a chemical structure of

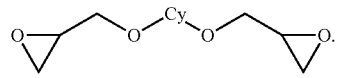

Cy is

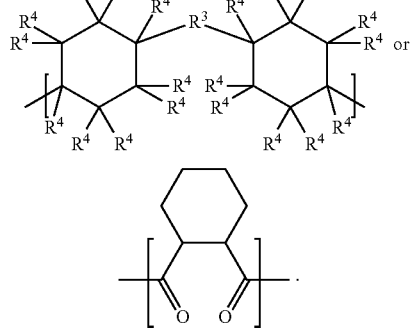

$R^3$ is —$CH_2$—, —$C(CH_3)_2$—, —CH=CH—, —CH=C($CH_3$)—, —O—, —C≡C—, —C=CH—CO—, —COO—, —CONH—, or —CO—. Each of $R^4$ is independently H, halogen, or $C_{1-8}$ alkyl group. In some embodiments, (b) cycloaliphatic epoxy resin monomer has a chemical structure of

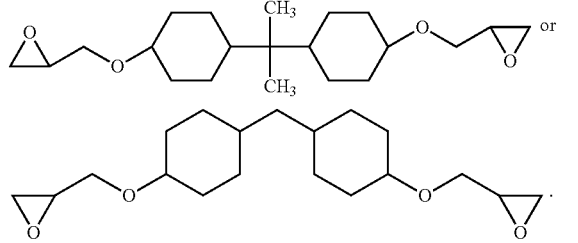

In some embodiments, (c) aliphatic epoxy resin monomer has a chemical structure of

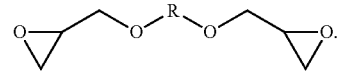

R is $C_{1-6}$ linear alkylene group substituted by hydrogen or $C_{1-8}$ alkyl group. In some embodiments, (c) aliphatic epoxy resin monomer has a chemical structure of

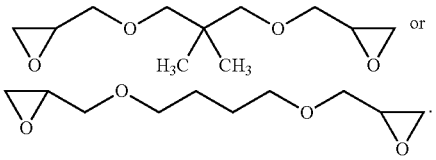

In some embodiments, the resin composition further includes (d) amine curing agent. Epoxy groups of (a) aromatic epoxy resin monomer, (b) cycloaliphatic epoxy resin monomer, and (c) aliphatic epoxy resin monomer and amino groups of (d) amine curing agent have a molar ratio of 1:1 to 2:1.

In some embodiments, the amine curing agent has a chemical structure of $H_2N$—$R^5$—$NH_2$ or $H_2N$—Ar'—O—$R^6$—O—Ar'—$NH_2$. $R^5$ is

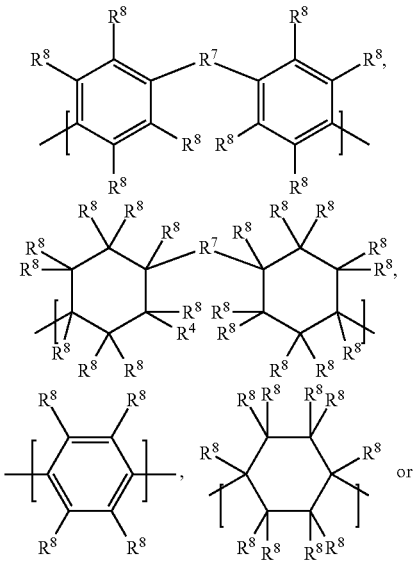

-continued

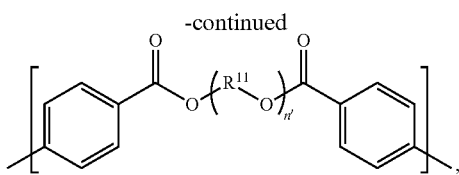

in which is $C_{1-6}$ alkylene group, and n'=1 to 10. $R^7$ is single bond, —O—, —SO$_2$—, —CH$_2$—, —(CH$_2$)$_2$—, or —C(CF$_3$)$_2$—. Each of $R^8$ is independently H, halogen, or $C_{1-8}$ alkyl group. $R^6$ is

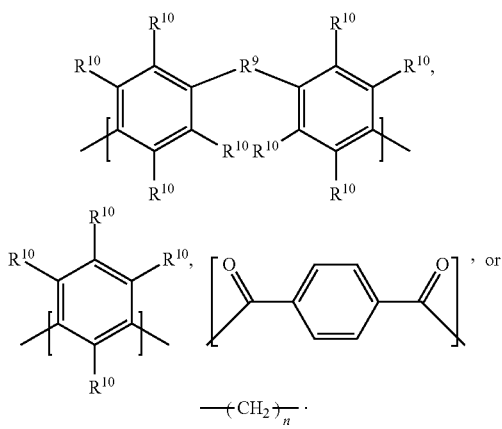

$R^9$ is single bond, —O—, —SO$_2$—, or —C(CF$_3$)$_2$—. Each of $R^{10}$ is independently H, halogen, or $C_{1-8}$ alkyl group. n is an integer of 3 to 12. Ar' is

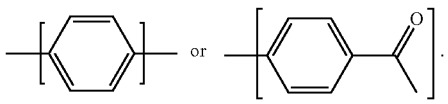

(d) Amine curing agent may include cycloaliphatic amine curing agent, aromatic amine curing agent, and aliphatic amine curing agent. In one embodiment, the amine curing agent includes a combination of the cycloaliphatic amine curing agent and the aromatic amine curing agent, which may further enhance the heat transfer coefficient of the cured resin composition.

In some embodiments, the resin composition further includes (e) thermally conductive filler. The total weight of (a) aromatic epoxy resin monomer, (b) cycloaliphatic epoxy resin monomer, and (c) aliphatic epoxy resin monomer and the weight of (e) thermally conductive filler may have a ratio of 70:30 to 5:95. The ratio of (e) thermally conductive filler that is too high may negatively affect the physical properties of the cured resin composition (i.e. flexibility and electrical insulation). (e) Thermally conductive filler can be metal, metal oxide, metal nitride, ceramic, carbon material, or a combination thereof. For example, (e) thermally conductive filler can be copper, gold, nickel, aluminum, or an alloy thereof, alumina, magnesium oxide, zinc oxide, beryllium oxide, boron nitride, aluminum nitride, silicon carbide, tungsten carbide, diamond, graphite, carbon fiber, carbon nanotube, or a combination thereof. In one embodiment, (e) thermally conductive filler is alumina.

One embodiment of the disclosure provides a method for manufacturing a thermally conductive material, which includes mixing 1 part by mole of (a) aromatic epoxy resin monomer, 0.25 to 1 part by mole of (b) cycloaliphatic epoxy resin monomer, and 1 to 9 parts by mole of (c) aliphatic epoxy resin monomer to form a resin composition. The method also heats and cures the resin composition to form a thermally conductive material. In some embodiments, the resin composition further includes (d) amine curing agent. Epoxy groups of (a) aromatic epoxy resin monomer, (b) cycloaliphatic epoxy resin monomer, and (c) aliphatic epoxy resin monomer and amino groups of (d) amine curing agent have a molar ratio of 1:1 to 2:1. In some embodiments, (d) amine curing agent includes a combination of the cycloaliphatic amine curing agent and the aromatic amine curing agent. In some embodiments, the resin composition further includes (e) thermally conductive filler. The total weight of (a) aromatic epoxy resin monomer, (b) cycloaliphatic epoxy resin monomer, and (c) aliphatic epoxy resin monomer and the weight of (e) thermally conductive filler may have a ratio of 70:30 to 5:95.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

The abbreviations, names, and structures of epoxy resin monomers and amine curing agents used in following Examples are listed in Table 1.

TABLE 1

| Epoxy resin monomer | | |
|---|---|---|
| Abbreviation | Name | Structure |
| NEO | Neopentyl glycol diglycidyl ether | |
| BUT | 1,4-Butanediol diglycidyl ether | |

TABLE 1-continued

| Epalloy 5000 | Hydrogenated bisphenol A epoxy resin monomer | 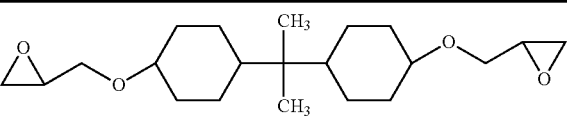 |
| 828 | EPON resin monomer 828 | 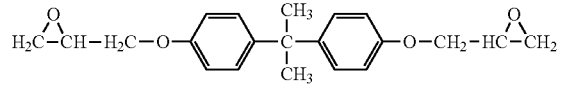 |
| YX4000 | 3,3',5,5'-Tetramethylbiphenyl diglycidyl ether | 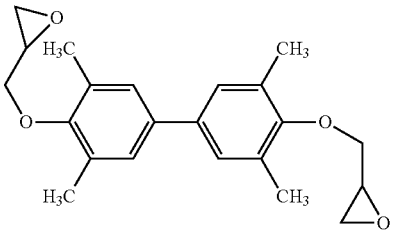 [SMILES: Cc1cc(-c2cc(C)c(OCC3CO3)c(C)c2)cc(C)c1OCC1CO1] |
| YX8000 | Hydrogenated bisphenol A epoxy resin monomer | 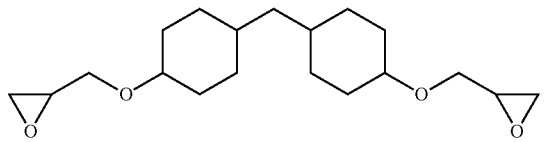 [SMILES: C1CC(OCC2CO2)CCC1CC1CCC(OCC2CO2)CC1] |
| Amine curing agent | | |
| JER-113 | 4,4'-Methylenebis(2-methylcyclohexylamine) | 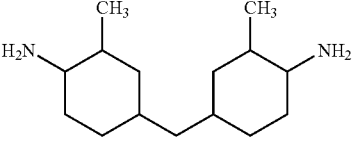 [SMILES: CC1CC(CC2CCC(N)C(C)C2)CCC1N] |
| DDM | 4,4'-Methylenedianiline | 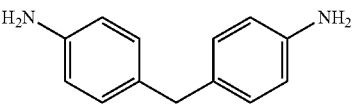 [SMILES: Nc1ccc(Cc2ccc(N)cc2)cc1] |
| DDE | 4,4'-Ethylenedianiline | 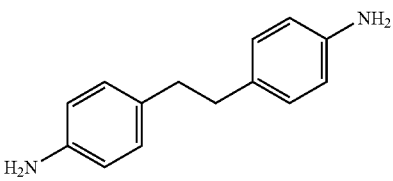 [SMILES: Nc1ccc(CCc2ccc(N)cc2)cc1] |
| CUAHARD-MED | 3,3',5,5'-Tetramethyl-4,4'-methylenedianiline | 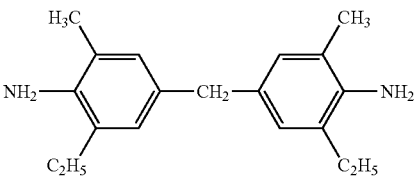 [SMILES: CCc1cc(Cc2cc(C)c(N)c(CC)c2)cc(C)c1N] |
| MDA | 3,3'-Dimethyl-4,4-methylenedianiline | 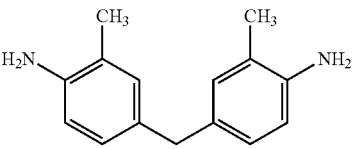 [SMILES: Cc1cc(Cc2ccc(N)c(C)c2)ccc1N] |
| DDS | 4,4'-Diaminodiphenylsulfone | 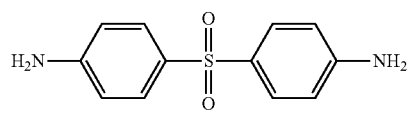 [SMILES: Nc1ccc(S(=O)(=O)c2ccc(N)cc2)cc1] |

TABLE 1-continued

| Abbreviation | Name | Structure |
|---|---|---|
| TPE-Q | 1,3-Bis(4'-aminophenoxyl)benzene | H₂N-C₆H₄-O-C₆H₄-O-C₆H₄-NH₂ (meta-linked central ring) |
| BAPB | 1,3-Bis(4'-aminophenoxyl)biphenyl | H₂N-C₆H₄-O-C₆H₄-C₆H₄-O-C₆H₄-NH₂ |
| m-Tolidine | 2,2'-Dimethyl-4,4'-diaminobiphenyl | H₂N-C₆H₃(CH₃)-C₆H₃(CH₃)-NH₂ |
| CHD | 1,4-Diaminocyclohexane | H₂N-C₆H₁₀-NH₂ |
| DACH | 4,4'-Diaminodicyclohexyl methane | H₂N-C₆H₁₀-CH₂-C₆H₁₀-NH₂ |
| CUA-4 | Propane-1,3-diyl bis(4-aminobenzoate) | NH₂-C₆H₄-CO-O-(CH₂)₃-O-OC-C₆H₄-NH₂ |
| ELASMER 250P | Poly(1,4-butanediol) bis(4-aminobenzoate) | NH₂-C₆H₄-CO-O-(CH₂CH₂CH₂CH₂O)$_n$-C(O)-C₆H₄-NH₂ |

The heat transfer coefficients of the thermally conductive materials prepared in the following Examples were measured using the standard ASTM-E1461. The volume resistivities of the thermally conductive materials prepared in the following Examples was measured using the standard ASTM-D257. The breakdown voltages of the thermally conductive materials prepared in the following Examples was measured using the standard ASTM-D149.

Example 1

5 g of the aliphatic epoxy resin monomer NEO and 4.264 g of the cycloaliphatic amine curing agent JER-113 were evenly mixed, and then put into an oven at 150° C. for 1 hour to be cured for obtaining a thermally conductive material.

Example 2

Example 2 was similar to Example 1, and the difference in Example 2 was 5 g of the epoxy resin monomer being replaced with a combination of the aliphatic epoxy resin monomer NEO and the cycloaliphatic epoxy resin monomer epalloy 5000 (molar ratio=8:2). The curing agent type and amount and the curing condition in Example 2 were similar to those in Example 1.

Example 3

Example 3 was similar to Example 1, and the difference in Example 3 was 5 g of the epoxy resin monomer being replaced with a combination of the aliphatic epoxy resin monomer NEO and the cycloaliphatic epoxy resin monomer epalloy 5000 (molar ratio=6:4). The curing agent type and amount and the curing condition in Example 3 were similar to those in Example 1.

Example 4

Example 3 was similar to Example 1, and the difference in Example 3 was 5 g of the epoxy resin monomer being replaced with a combination of the aliphatic epoxy resin monomer NEO and the cycloaliphatic epoxy resin monomer epalloy 5000 (molar ratio=5:5). The curing agent type and amount and the curing condition in Example 4 were similar to those in Example 1.

TABLE 2

| | Example 1 | Example 2 | Example 3 | Example 4 |
|---|---|---|---|---|
| Epoxy resin monomer | NEO | NEO + epalloy | NEO + epalloy | NEO + epalloy |

TABLE 2-continued

|  | Example 1 | Example 2 | Example 3 | Example 4 |
|---|---|---|---|---|
| (Molar ratio) |  | 5000 (8:2) | 5000 (6:4) | 5000 (5:5) |
| Amine curing agent | JER-113 | JER-113 | JER-113 | JER-113 |
| Heat transfer coefficient (W/mK) | 0.20 | 0.23 | 0.25 | 0.26 |
| Volume resistivity (Ω-cm) | $10^{13}$ | $10^{12}$ | $10^{13}$ | $10^{13}$ |
| Breakdown voltage (KV/mil) | 1.7 | 1.9 | 2.3 | 2.3 |

As shown in Table 2, the thermally conductive materials from the combinations of the aliphatic epoxy resin monomer NEO and the cycloaliphatic epoxy resin monomer epalloy 5000 had higher heat transfer coefficients and higher breakdown voltages than those of the thermally conductive material from only the aliphatic epoxy resin monomer NEO.

Example 5

Example 5 was similar to Example 1, and the difference in Example 5 was 5 g of the epoxy resin monomer being replaced with a combination of the aliphatic epoxy resin monomer NEO and the cycloaliphatic epoxy resin monomer YX8000 (molar ratio=8:2). The curing agent type and amount and the curing condition in Example 5 were similar to those in Example 1.

Example 6

Example 6 was similar to Example 1, and the difference in Example 6 was 5 g of the epoxy resin monomer being replaced with a combination of the aliphatic epoxy resin monomer NEO and the cycloaliphatic epoxy resin monomer YX8000 (molar ratio=7:3). The curing agent type and amount and the curing condition in Example 6 were similar to those in Example 1.

Example 7

Example 7 was similar to Example 1, and the difference in Example 7 was 5 g of the epoxy resin monomer being replaced with a combination of the aliphatic epoxy resin monomer NEO and the cycloaliphatic epoxy resin monomer YX8000 (molar ratio=6:4). The curing agent type and amount and the curing condition in Example 7 were similar to those in Example 1.

Example 8

Example 8 was similar to Example 1, and the difference in Example 8 was 5 g of the epoxy resin monomer being replaced with a combination of the aliphatic epoxy resin monomer NEO and the cycloaliphatic epoxy resin monomer YX8000 (molar ratio=5:5). The curing agent type and amount and the curing condition in Example 8 were similar to those in Example 1.

TABLE 3

|  | Example 5 | Example 6 | Example 7 | Example 8 |
|---|---|---|---|---|
| Epoxy resin monomer (Molar ratio) | NEO + YX8000 (8:2) | NEO + YX8000 (7:3) | NEO + YX8000 (6:4) | NEO + YX8000 (5:5) |
| Amine curing agent | JER-113 | JER-113 | JER-113 | JER-113 |
| Heat transfer coefficient (W/mK) | 0.25 | 0.26 | 0.26 | 0.28 |
| Volume resistivity (Ω-cm) | $10^{12}$ | $10^{13}$ | $10^{14}$ | $10^{12}$ |
| Breakdown voltage (KV/mil) | 1.8 | 1.9 | 2.4 | 2.3 |

As shown in Table 3, the thermally conductive material from the aliphatic epoxy resin monomer NEO and the cycloaliphatic epoxy resin monomer YX8000 with a molar ratio of 6:4 (in the combination of the aliphatic epoxy resin monomer NEO and the cycloaliphatic epoxy resin monomer YX8000) had a higher heat transfer coefficient, a higher volume resistivity, and a higher breakdown voltage.

Example 9

Example 9 was similar to Example 1, and the difference in Example 9 was 5 g of the epoxy resin monomer being replaced with a combination of the aliphatic epoxy resin monomer NEO, the cycloaliphatic epoxy resin monomer epalloy 5000, and the aromatic epoxy resin monomer YX4000 (molar ratio=7:2:1). The curing agent type and amount and the curing condition in Example 9 were similar to those in Example 1.

Example 10

Example 10 was similar to Example 1, and the difference in Example 10 was 5 g of the epoxy resin monomer being replaced with a combination of the aliphatic epoxy resin monomer NEO, the cycloaliphatic epoxy resin monomer epalloy 5000, and the aromatic epoxy resin monomer YX4000 (molar ratio=6:1:3). The curing agent type and amount and the curing condition in Example 10 were similar to those in Example 1.

Example 11

Example 11 was similar to Example 1, and the difference in Example 11 was 5 g of the epoxy resin monomer being replaced with a combination of the aliphatic epoxy resin monomer NEO, the cycloaliphatic epoxy resin monomer epalloy 5000, and the aromatic epoxy resin monomer YX4000 (molar ratio=5:1:4). The curing agent type and amount and the curing condition in Example 11 were similar to those in Example 1.

Example 12

Example 12 was similar to Example 1, and the difference in Example 12 was 5 g of the epoxy resin monomer being replaced with a combination of the aliphatic epoxy resin monomer NEO, the cycloaliphatic epoxy resin monomer epalloy 5000, and the aromatic epoxy resin monomer YX4000 (molar ratio=5:2:3). The curing agent type and amount and the curing condition in Example 12 were similar to those in Example 1.

TABLE 4

|  | Example 9 | Example 10 | Example 11 | Example 12 |
|---|---|---|---|---|
| Epoxy resin monomer (Molar ratio) | NEO + epalloy 5000 + YX4000 (7:2:1) | NEO + epalloy 5000 + YX4000 (6:1:3) | NEO + epalloy 5000 + YX4000 (5:1:4) | NEO + epalloy 5000 + YX4000 (5:2:3) |
| Amine curing agent | JER-113 | JER-113 | JER-113 | JER-113 |
| Heat transfer coefficient (W/mK) | 0.32 | 0.35 | 0.39 | 0.36 |
| Volume resistivity (Ω-cm) | $10^{11}$ | $10^{13}$ | $10^{12}$ | $10^{15}$ |
| Breakdown voltage (KV/mil) | 2.2 | 2.3 | 2.6 | 2.5 |

As shown in Tables 2 and 4, the thermally conductive materials from the combinations of the aliphatic epoxy resin monomer NEO, the cycloaliphatic epoxy resin monomer epalloy 5000, and the aromatic epoxy resin monomer YX4000 had higher heat transfer coefficients than those of the thermally conductive materials from the combinations of the aliphatic epoxy resin monomer NEO and the cycloaliphatic epoxy resin monomer epalloy 5000.

Example 13

Example 13 was similar to Example 1, and the difference in Example 13 was 5 g of the epoxy resin monomer being replaced with a combination of the aliphatic epoxy resin monomer NEO, the cycloaliphatic epoxy resin monomer YX8000, and the aromatic epoxy resin monomer YX4000 (molar ratio=7:2:1). The curing agent type and amount and the curing condition in Example 13 were similar to those in Example 1.

Example 14

Example 14 was similar to Example 1, and the difference in Example 14 was 5 g of the epoxy resin monomer being replaced with a combination of the aliphatic epoxy resin monomer NEO, the cycloaliphatic epoxy resin monomer YX8000, and the aromatic epoxy resin monomer YX4000 (molar ratio=6:1:3). The curing agent type and amount and the curing condition in Example 14 were similar to those in Example 1.

Example 15

Example 15 was similar to Example 1, and the difference in Example 15 was 5 g of the epoxy resin monomer being replaced with a combination of the aliphatic epoxy resin monomer NEO, the cycloaliphatic epoxy resin monomer YX8000, and the aromatic epoxy resin monomer YX4000 (molar ratio=5:1:4). The curing agent type and amount and the curing condition in Example 15 were similar to those in Example 1.

Example 16

Example 16 was similar to Example 1, and the difference in Example 16 was 5 g of the epoxy resin monomer being replaced with a combination of the aliphatic epoxy resin monomer NEO, the cycloaliphatic epoxy resin monomer YX8000, and the aromatic epoxy resin monomer YX4000 (molar ratio=5:2:3). The curing agent type and amount and the curing condition in Example 16 were similar to those in Example 1.

TABLE 5

|  | Example 13 | Example 14 | Example 15 | Example 16 |
|---|---|---|---|---|
| Epoxy resin monomer (Molar ratio) | NEO + YX8000 + YX4000 (7:2:1) | NEO + YX8000 + YX4000 (6:1:3) | NEO + YX8000 + YX4000 (5:1:4) | NEO + YX8000 + YX4000 (5:2:3) |
| Amine curing agent | JER-113 | JER-113 | JER-113 | JER-113 |
| Heat transfer coefficient (W/mK) | 0.36 | 0.36 | 0.42 | 0.38 |
| Volume resistivity (Ω-cm) | $10^{13}$ | $10^{12}$ | $10^{15}$ | $10^{13}$ |
| Breakdown voltage (KV/mil) | 2.0 | 2.3 | 2.5 | 2.5 |

As shown in Tables 3 and 5, the thermally conductive materials from the combinations of the aliphatic epoxy resin monomer NEO, the cycloaliphatic epoxy resin monomer YX8000, and the aromatic epoxy resin monomer YX4000 had higher heat transfer coefficients than those of the thermally conductive materials from the combinations of the aliphatic epoxy resin monomer NEO and the cycloaliphatic epoxy resin monomer YX8000.

Example 17

5 g of a combination of the aliphatic epoxy resin monomer NEO, the cycloaliphatic epoxy resin monomer YX8000, and the aromatic epoxy resin monomer YX4000 (molar ratio=5:1:4), and 1.148 g of a combination of the cycloaliphatic amine curing agent JER-113 and 0.954 g of the aromatic amine curing agent DDM (molar ratio=1:1) were evenly mixed, and then put into an oven at 150° C. for 1 hour to be cured for obtaining a thermally conductive material.

Example 18

Example 18 was similar to Example 17, and the difference in Example 18 was the amine curing agent being replaced with 1.148 g of a combination of the cycloaliphatic amine curing agent JER-113 and 1.022 g the aromatic amine curing agent DDE (molar ratio=1:1). The other curing conditions in Example 18 were similar to those in Example 17.

Example 19

Example 19 was similar to Example 17, and the difference in Example 19 was the amine curing agent being replaced with 1.148 g of the cycloaliphatic amine curing agent JER-113 and 1.359 g of the aromatic amine curing agent CUAHARD-MED (molar ratio=1:1). The other curing conditions in Example 19 were similar to those in Example 17.

Example 20

Example 20 was similar to Example 17, and the difference in Example 20 was the amine curing agent being replaced with 1.148 g of the cycloaliphatic amine curing agent JER-113 and 1.089 g of the aromatic amine curing agent MDA (molar ratio=1:1). The other curing conditions in Example 20 were similar to those in Example 17.

TABLE 6

|  | Example 17 | Example 18 | Example 19 | Example 20 |
|---|---|---|---|---|
| Epoxy resin monomer (Molar ratio) | NEO + YX8000 + YX4000 (5:1:4) | NEO + YX8000 + YX4000 (5:1:4) | NEO + YX8000 + YX4000 (5:1:4) | NEO + YX8000 + YX4000 (5:1:4) |
| Amine curing agent (Molar ratio) | JER-113 + DDM (1:1) | JER-113 + DDE (1:1) | JER-113 + CUAHARD-MED (1:1) | JER-113 + MDA (1:1) |
| Heat transfer coefficient (W/mK) | 0.41 | 0.43 | 0.41 | 0.41 |
| Volume resistivity (Ω-cm) | $10^{13}$ | $10^{12}$ | $10^{15}$ | $10^{13}$ |
| Breakdown voltage (KV/mil) | 2.0 | 2.3 | 2.5 | 2.5 |

As shown in the comparison of Example 15 in Table 5 and Table 6, the combinations of the cycloaliphatic amine curing agent JER-113 and the aromatic amine curing agents could increase the heat transfer coefficients of the thermally conductive materials.

Example 21

Example 21 was similar to Example 17, and the difference in Example 21 was the amine curing agent being replaced with 1.148 g of the cycloaliphatic amine curing agent JER-113 and 1.195 g of the aromatic amine curing agent DDS (molar ratio=1:1). The other curing conditions in Example 21 were similar to those in Example 17.

Example 22

Example 22 was similar to Example 17, and the difference in Example 22 was the amine curing agent being replaced with 1.148 g of the cycloaliphatic amine curing agent JER-113 and 1.407 g of the aromatic amine curing agent TPE-Q (molar ratio=1:1). The other curing conditions in Example 22 were similar to those in Example 17.

Example 23

Example 23 was similar to Example 17, and the difference in Example 23 was the amine curing agent being replaced with 1.148 g of the cycloaliphatic amine curing agent JER-113 and 1.771 g of the aromatic amine curing agent BAPB (molar ratio=1:1). The other curing conditions in Example 23 were similar to those in Example 17.

Example 24

Example 24 was similar to Example 17, and the difference in Example 24 was the amine curing agent being replaced with 1.148 g of the cycloaliphatic amine curing agent JER-113 and 1.022 g of the aromatic amine curing agent m-Tolidine (molar ratio=1:1). The other curing conditions in Example 24 were similar to those in Example 17.

TABLE 7

|  | Example 21 | Example 22 | Example 23 | Example 24 |
|---|---|---|---|---|
| Epoxy resin monomer (Molar ratio) | NEO + YX8000 + YX4000 (5:1:4) | NEO + YX8000 + YX4000 (5:1:4) | NEO + YX8000 + YX4000 (5:1:4) | NEO + YX8000 + YX4000 (5:1:4) |
| Amine curing agent (Molar ratio) | JER-113 + DDS (1:1) | JER-113 + TPE-Q (1:1) | JER-113 + BAPB (1:1) | JER-113 + m-Tolidine (1:1) |
| Heat transfer coefficient (W/mK) | 0.37 | 0.38 | 0.45 | 0.40 |
| Volume resistivity (Ω-cm) | $10^{13}$ | $10^{13}$ | $10^{11}$ | $10^{12}$ |
| Breakdown voltage (KV/mil) | 2.8 | 2.4 | 2.4 | 2.3 |

As shown in the comparison of Example 15 in Table 5 and Table 7, the combinations of the cycloaliphatic amine curing agent JER-113 and the aromatic amine curing agents could increase the heat transfer coefficients or the breakdown voltages of the thermally conductive materials.

Example 25

Example 25 was similar to Example 17, and the difference in Example 25 was the amine curing agent being replaced with 1.148 g of the cycloaliphatic amine curing agent JER-113 and 0.550 g of the cycloaliphatic amine curing agent CHQ (molar ratio=1:1). The other curing conditions in Example 25 were similar to those in Example 17.

Example 26

Example 26 was similar to Example 17, and the difference in Example 26 was the amine curing agent being replaced with 1.148 g of the cycloaliphatic amine curing agent JER-113 and 1.013 g of the cycloaliphatic amine curing agent DACH (molar ratio=1:1). The other curing conditions in Example 26 were similar to those in Example 17.

Example 27

Example 27 was similar to Example 17, and the difference in Example 27 was the amine curing agent being replaced with 1.148 g of the cycloaliphatic amine curing agent JER-113 and 1.718 g of the aromatic amine curing agent CUA-4 (molar ratio=1:1). The other curing conditions in Example 27 were similar to those in Example 17.

Example 28

Example 28 was similar to Example 17, and the difference in Example 28 was the amine curing agent being replaced with 1.148 g of the cycloaliphatic amine curing agent JER-113 and 2.349 g of the aromatic amine curing agent ELASMER 250P (molar ratio=1:1).

The other curing conditions in Example 28 were similar to those in Example 17.

TABLE 8

| | Example 25 | Example 26 | Example 27 | Example 28 |
|---|---|---|---|---|
| Epoxy resin monomer (Molar ratio) | NEO + YX8000 + YX4000 (5:1:4) | NEO + YX8000 + YX4000 (5:1:4) | NEO + YX8000 + YX4000 (5:1:4) | NEO + YX8000 + YX4000 (5:1:4) |
| Amine curing agent (Molar ratio) | JER-113 + CHD (1:1) | JER-113 + DACH (1:1) | JER-113 + CUA-4 (1:1) | JER-113 + ELASMER 250P (1:1) |
| Heat transfer coefficient (W/mK) | 0.40 | 0.41 | 0.45 | 0.49 |
| Volume resistivity (Ω-cm) | $10^{13}$ | $10^{12}$ | $10^{12}$ | $10^{11}$ |
| Breakdown voltage (KV/mil) | 2.6 | 2.6 | 2.3 | 2.3 |

As shown in the comparison of Example 15 in Table 5 and Table 8, the combinations of the cycloaliphatic amine curing agent JER-113 and the aromatic amine curing agents could increase the heat transfer coefficients of the thermally conductive materials.

Example 29

5 g of the aliphatic epoxy resin monomer BUT and 3.870 g of the cycloaliphatic amine curing agent JER-113 were evenly mixed, and then put into an oven at 150° C. for 1 hour to be cured for obtaining a thermally conductive material.

Example 30

Example 30 was similar to Example 29, and the difference in Example 30 was 5 g of the epoxy resin monomer being replaced with a combination of the aliphatic epoxy resin monomer BUT and the cycloaliphatic epoxy resin monomer epalloy 5000 (molar ratio=8:2). The curing agent type and amount and the curing condition in Example 30 were similar to those in Example 29.

Example 31

Example 31 was similar to Example 29, and the difference in Example 31 was 5 g of the epoxy resin monomer being replaced with a combination of the aliphatic epoxy resin monomer BUT and the cycloaliphatic epoxy resin monomer epalloy 5000 (molar ratio=6:4). The curing agent type and amount and the curing condition in Example 31 were similar to those in Example 29.

Example 32

Example 32 was similar to Example 29, and the difference in Example 32 was 5 g of the epoxy resin monomer being replaced with a combination of the aliphatic epoxy resin monomer BUT and the cycloaliphatic epoxy resin monomer epalloy 5000 (molar ratio=5:5). The curing agent type and amount and the curing condition in Example 32 were similar to those in Example 29.

TABLE 9

| | Example 29 | Example 30 | Example 31 | Example 32 |
|---|---|---|---|---|
| Epoxy resin (Molar ratio) | BUT | BUT + epalloy 5000 (8:2) | BUT + epalloy 5000 (6:4) | BUT + epalloy 5000 (5:5) |
| Amine curing agent | JER-113 | JER-113 | JER-113 | JER-113 |
| Heat transfer coefficient (W/mK) | 0.19 | 0.22 | 0.25 | 0.25 |
| Volume resistivity (Ω-cm) | $10^{14}$ | $10^{12}$ | $10^{12}$ | $10^{12}$ |
| Breakdown voltage (KV/mil) | 1.8 | 1.9 | 2.2 | 2.2 |

As shown in Table 9, the thermally conductive materials made from the combinations of the aliphatic epoxy resin monomer BUT and the cycloaliphatic epoxy resin monomer epalloy 5000 had higher heat transfer coefficients and breakdown voltages than those of the thermally conductive material made from only the aliphatic epoxy resin BUT.

Example 33

Example 33 was similar to Example 29, and the difference in Example 33 was 5 g of the epoxy resin monomer being replaced with a combination of the aliphatic epoxy resin monomer BUT and the cycloaliphatic epoxy resin monomer YX8000 (molar ratio=8:2). The curing agent type and amount and the curing condition in Example 33 were similar to those in Example 29.

Example 34

Example 34 was similar to Example 29, and the difference in Example 34 was 5 g of the epoxy resin monomer being replaced with a combination of the aliphatic epoxy resin monomer BUT and the cycloaliphatic epoxy resin monomer YX8000 (molar ratio=7:3). The curing agent type and amount and the curing condition in Example 34 were similar to those in Example 29.

Example 35

Example 35 was similar to Example 29, and the difference in Example 35 was 5 g of the epoxy resin monomer being replaced with a combination of the aliphatic epoxy resin monomer BUT and the cycloaliphatic epoxy resin monomer YX8000 (molar ratio=6:4). The curing agent type and amount and the curing condition in Example 35 were similar to those in Example 29.

Example 36

Example 36 was similar to Example 29, and the difference in Example 36 was 5 g of the epoxy resin monomer being replaced with a combination of the aliphatic epoxy resin monomer BUT and the cycloaliphatic epoxy resin monomer YX8000 (molar ratio=5:5). The curing agent type and amount and the curing condition in Example 36 were similar to those in Example 29.

TABLE 10

|  | Example 33 | Example 34 | Example 35 | Example 36 |
|---|---|---|---|---|
| Epoxy resin monomer (Molar ratio) | BUT | BUT + YX8000 (8:2) | BUT + YX8000 (6:4) | BUT + YX8000 (5:5) |
| Amine curing agent | JER-113 | JER-113 | JER-113 | JER-113 |
| Heat transfer coefficient (W/mK) | 0.25 | 0.26 | 0.26 | 0.28 |
| Volume resistivity (Ω-cm) | $10^{13}$ | $10^{13}$ | $10^{14}$ | $10^{12}$ |
| Breakdown voltage (KV/mil) | 1.9 | 1.9 | 2.2 | 2.3 |

As shown in Table 10, the thermally conductive materials made from the combination of the aliphatic epoxy resin monomer BUT and the cycloaliphatic epoxy resin monomer YX8000 with a higher molar ratio of the cycloaliphatic epoxy resin monomer YX8000 had higher heat transfer coefficients and higher breakdown voltages.

Example 37

Example 37 was similar to Example 29, and the difference in Example 37 was 5 g of the epoxy resin monomer being replaced with a combination of the aliphatic epoxy resin monomer BUT, the cycloaliphatic epoxy resin monomer epalloy 5000, and the aromatic epoxy resin monomer YX4000 (molar ratio=7:2:1). The curing agent type and amount and the curing condition in Example 37 were similar to those in Example 29.

Example 38

Example 38 was similar to Example 29, and the difference in Example 38 was 5 g of the epoxy resin monomer being replaced with a combination of the aliphatic epoxy resin monomer BUT, the cycloaliphatic epoxy resin monomer epalloy 5000, and the aromatic epoxy resin monomer YX4000 (molar ratio=6:1:3). The curing agent type and amount and the curing condition in Example 38 were similar to those in Example 29.

Example 39

Example 39 was similar to Example 29, and the difference in Example 39 was 5 g of the epoxy resin monomer being replaced with a combination of the aliphatic epoxy resin monomer BUT, the cycloaliphatic epoxy resin epalloy monomer 5000, and the aromatic epoxy resin monomer YX4000 (molar ratio=5:1:4). The curing agent type and amount and the curing condition in Example 39 were similar to those in Example 29.

Example 40

Example 40 was similar to Example 29, and the difference in Example 40 was 5 g of the epoxy resin monomer being replaced with a combination of the aliphatic epoxy resin monomer BUT, the cycloaliphatic epoxy resin monomer epalloy 5000, and the aromatic epoxy resin monomer YX4000 (molar ratio=5:2:3). The curing agent type and amount and the curing condition in Example 40 were similar to those in Example 29.

TABLE 11

|  | Example 37 | Example 38 | Example 39 | Example 40 |
|---|---|---|---|---|
| Epoxy resin monomer (Molar ratio) | BUT + epalloy 5000 + YX4000 (7:2:1) | BUT + epalloy 5000 + YX4000 (6:1:3) | BUT + epalloy 5000 + YX4000 (5:1:4) | BUT + epalloy 5000 + YX4000 (5:2:3) |
| Amine curing agent | JER-113 | JER-113 | JER-113 | JER-113 |
| Heat transfer coefficient (W/mK) | 0.31 | 0.33 | 0.38 | 0.37 |
| Volume resistivity (Ω-cm) | $10^{12}$ | $10^{13}$ | $10^{13}$ | $10^{14}$ |
| Breakdown voltage (KV/mil) | 2.1 | 2.2 | 2.1 | 2.1 |

As shown in Tables 9 and 11, the thermally conductive materials made from the combinations of the aliphatic epoxy resin monomer BUT, the cycloaliphatic epoxy resin monomer epalloy 5000, and the aromatic epoxy resin monomer YX4000 had higher heat transfer coefficients than those of the thermally conductive materials made from the combinations of the aliphatic epoxy resin monomer BUT and the cycloaliphatic epoxy resin monomer epalloy 5000.

Example 41

Example 41 was similar to Example 29, and the difference in Example 41 was 5 g of the epoxy resin monomer being replaced with a combination of the aliphatic epoxy resin monomer BUT, the cycloaliphatic epoxy resin monomer YX8000, and the aromatic epoxy resin monomer YX4000 (molar ratio=7:2:1). The curing agent type and amount and the curing condition in Example 41 were similar to those in Example 29.

Example 42

Example 42 was similar to Example 29, and the difference in Example 42 was 5 g of the epoxy resin monomer being replaced with a combination of the aliphatic epoxy resin monomer BUT, the cycloaliphatic epoxy resin monomer YX8000, and the aromatic epoxy resin monomer YX4000 (molar ratio=6:1:3). The curing agent type and amount and the curing condition in Example 42 were similar to those in Example 29.

Example 43

Example 43 was similar to Example 29, and the difference in Example 43 was 5 g of the epoxy resin monomer being replaced with a combination of the aliphatic epoxy resin monomer BUT, the cycloaliphatic epoxy resin monomer YX8000, and the aromatic epoxy resin monomer YX4000 (molar ratio=5:1:4). The curing agent type and amount and the curing condition in Example 43 were similar to those in Example 29.

Example 44

Example 44 was similar to Example 29, and the difference in Example 44 was 5 g of the epoxy resin monomer being replaced with a combination of the aliphatic epoxy resin monomer BUT, the cycloaliphatic epoxy resin monomer YX8000, and the aromatic epoxy resin monomer YX4000 (molar ratio=5:2:3). The curing agent type and amount and the curing condition in Example 44 were similar to those in Example 29.

As shown in Tables 10 and 12, the thermally conductive materials made from the combinations of the aliphatic epoxy resin monomer BUT, the cycloaliphatic epoxy resin monomer YX8000, and the aromatic epoxy resin monomer YX4000 had higher heat transfer coefficients than those of the thermally conductive materials made from the combinations of the aliphatic epoxy resin monomer BUT and the cycloaliphatic epoxy resin monomer YX8000.

Example 45

5 g of a combination of the aliphatic epoxy resin monomer BUT, the cycloaliphatic epoxy resin monomer YX8000, and the aromatic epoxy resin monomer YX4000 (molar ratio=5:1:4), and 1.117 g of a combination of the cycloaliphatic amine curing agent JER-113 and 0.929 g of the aromatic amine curing agent DDM (molar ratio=1:1) were evenly mixed, and then put into an oven at 150° C. for 1 hour to be cured for obtaining a thermally conductive material.

Example 46

Example 46 was similar to Example 45, and the difference in Example 46 was the amine curing agent being replaced with 1.117 g of the cycloaliphatic amine curing agent JER-113 and 0.995 g the aromatic amine curing agent DDE (molar ratio=1:1). The other curing conditions in Example 46 were similar to those in Example 45.

Example 47

Example 47 was similar to Example 45, and the difference in Example 47 was the amine curing agent being replaced with 1.117 g of the cycloaliphatic amine curing agent JER-113 and 1.323 g the aromatic amine curing agent CUAHARD-MED (molar ratio=1:1). The other curing conditions in Example 47 were similar to those in Example 45.

Example 48

Example 48 was similar to Example 45, and the difference in Example 48 was the amine curing agent being replaced with 1.117 g of the cycloaliphatic amine curing agent JER-113 and 1.060 g the aromatic amine curing agent MDA (molar ratio=1:1). The other curing conditions in Example 48 were similar to those in Example 45.

TABLE 12

| | Example 41 | Example 42 | Example 43 | Example 44 |
|---|---|---|---|---|
| Epoxy resin monomer | BUT + YX8000 + YX4000 | BUT + YX8000 + YX4000 | BUT + YX8000 + YX4000 | BUT + YX8000 + YX4000 |
| (Molar ratio) | (7:2:1) | (6:1:3) | (5:1:4) | (5:2:3) |
| Amine curing agent | JER-113 | JER-113 | JER-113 | JER-113 |
| Heat transfer coefficient (W/mK) | 0.35 | 0.37 | 0.41 | 0.38 |
| Volume resistivity (Ω-cm) | $10^{13}$ | $10^{13}$ | $10^{14}$ | $10^{13}$ |
| Breakdown voltage (KV/mil) | 2.0 | 2.2 | 2.4 | 2.5 |

TABLE 13

|  | Example 45 | Example 46 | Example 47 | Example 48 |
|---|---|---|---|---|
| Epoxy resin monomer (Molar ratio) | BUT + YX8000 + YX4000 (5:1:4) | BUT + YX8000 + YX4000 (5:1:4) | BUT + YX8000 + YX4000 (5:1:4) | BUT + YX8000 + YX4000 (5:1:4) |
| Amine curing agent (Molar ratio) | JER-113 + DDM (1:1) | JER-113 + DDE (1:1) | JER-113 + CUAHARD-MED (1:1) | JER-113 + MDA (1:1) |
| Heat transfer coefficient (W/mK) | 0.41 | 0.43 | 0.42 | 0.41 |
| Volume resistivity (Ω-cm) | $10^{12}$ | $10^{11}$ | $10^{11}$ | $10^{12}$ |
| Breakdown voltage (KV/mil) | 2.2 | 2.2 | 2.4 | 2.4 |

As shown in the comparison of Example 43 in Table 12 and Table 13, the combinations of the cycloaliphatic amine curing agent JER-113 and the some aromatic amine curing agents (e.g. DDE and CUAHARD-MED) could increase the heat transfer coefficients of the thermally conductive materials.

Example 49

Example 49 was similar to Example 45, and the difference in Example 49 was the amine curing agent being replaced with 1.117 g of the cycloaliphatic amine curing agent JER-113 and 1.163 g the aromatic amine curing agent DDS (molar ratio=1:1). The other curing conditions in Example 49 were similar to those in Example 45.

Example 50

Example 50 was similar to Example 45, and the difference in Example 50 was the amine curing agent being replaced with 1.117 g of the cycloaliphatic amine curing agent JER-113 and 1.370 g the aromatic amine curing agent TPE-Q (molar ratio=1:1). The other curing conditions in Example 50 were similar to those in Example 45.

Example 51

Example 51 was similar to Example 45, and the difference in Example 51 was the amine curing agent being replaced with 1.117 g of the cycloaliphatic amine curing agent JER-113 and 1.724 g the aromatic amine curing agent BAPB (molar ratio=1:1). The other curing conditions in Example 51 were similar to those in Example 45.

Example 52

Example 52 was similar to Example 45, and the difference in Example 52 was the amine curing agent being replaced with 1.117 g of the cycloaliphatic amine curing agent JER-113 and 0.995 g the aromatic amine curing agent m-Tolidine (molar ratio=1:1). The other curing conditions in Example 52 were similar to those in Example 45.

TABLE 14

|  | Example 49 | Example 50 | Example 51 | Example 52 |
|---|---|---|---|---|
| Epoxy resin monomer (Molar ratio) | BUT + YX8000 + YX4000 (5:1:4) | BUT + YX8000 + YX4000 (5:1:4) | BUT + YX8000 + YX4000 (5:1:4) | BUT + YX8000 + YX4000 (5:1:4) |
| Amine curing agent (Molar ratio) | JER-113 + DDS (1:1) | JER-113 + TPE-Q (1:1) | JER-113 + BAPB (1:1) | JER-113 + m-Tolidine (1:1) |
| Heat transfer coefficient (W/mK) | 0.37 | 0.36 | 0.46 | 0.41 |
| Volume resistivity (Ω-cm) | $10^{13}$ | $10^{12}$ | $10^{12}$ | $10^{13}$ |
| Breakdown voltage (KV/mil) | 2.8 | 2.4 | 2.4 | 2.3 |

As shown in the comparison of Example 43 in Table 12 and Table 14, the combination of the cycloaliphatic amine curing agent JER-113 and the some aromatic amine curing agents (e.g. BAPB) could increase the heat transfer coefficient of the thermally conductive material.

Example 53

Example 53 was similar to Example 45, and the difference in Example 53 was the amine curing agent being replaced with 1.117 g of the cycloaliphatic amine curing agent JER-113 and 0.535 g the cycloaliphatic amine curing agent CHD (molar ratio=1:1). The other curing conditions in Example 53 were similar to those in Example 45.

Example 54

Example 54 was similar to Example 45, and the difference in Example 54 was the amine curing agent being replaced with 1.117 g of the cycloaliphatic amine curing agent JER-113 and 0.986 g the cycloaliphatic amine curing agent DACH (molar ratio=1:1). The other curing conditions in Example 54 were similar to those in Example 45.

Example 55

Example 55 was similar to Example 45, and the difference in Example 55 was the amine curing agent being replaced with 1.117 g of the cycloaliphatic amine curing agent JER-113 and 1.673 g the aromatic amine curing agent CUA-4 (molar ratio=1:1). The other curing conditions in Example 55 were similar to those in Example 45.

Example 56

Example 56 was similar to Example 45, and the difference in Example 56 was the amine curing agent being replaced with 1.117 g of the cycloaliphatic amine curing agent JER-113 and 2.286 g the aromatic amine curing agent ELASMER 250P (molar ratio=1:1). The other curing conditions in Example 56 were similar to those in Example 45.

TABLE 15

|  | Example 53 | Example 54 | Example 55 | Example 56 |
|---|---|---|---|---|
| Epoxy resin monomer (Molar ratio) | BUT + YX8000 + YX4000 (5:1:4) | BUT + YX8000 + YX4000 (5:1:4) | BUT + YX8000 + YX4000 (5:1:4) | BUT + YX8000 + YX4000 (5:1:4) |
| Amine curing agent (Molar ratio) | JER-113 + CHD (1:1) | JER-113 + DACH (1:1) | JER-113 + CUA-4 (1:1) | JER-113 + ELASMER250P (1:1) |
| Heat transfer coefficient (W/mK) | 0.42 | 0.42 | 0.46 | 0.48 |
| Volume resistivity (Ω-cm) | $10^{13}$ | $10^{13}$ | $10^{12}$ | $10^{11}$ |
| Breakdown voltage (KV/mil) | 2.4 | 2.5 | 2.3 | 2.3 |

As shown in the comparison of Example 43 in Table 12 and Table 15, the combinations of the two amine curing agent could increase the heat transfer coefficients of the thermally conductive materials.

Comparative Example 1

5 g of the aromatic epoxy resin monomer 828 and 1.642 g of the aromatic amine curing agent DDS were evenly mixed, and then put into an oven at 150° C. for 1 hour to be cured for obtaining a thermally conductive material.

Comparative Example 2

5 g of the aliphatic epoxy resin monomer NEO and 4.264 g of the cycloaliphatic amine curing agent JER-113 were evenly mixed, and then put into an oven at 150° C. for 1 hour to be cured for obtaining a thermally conductive material.

Comparative Example 3

5 g of the aliphatic epoxy resin monomer BUT and 3.870 g of the cycloaliphatic amine curing agent JER-113 were evenly mixed, and then put into an oven at 150° C. for 1 hour to be cured for obtaining a thermally conductive material.

TABLE 15

|  | Comparative Example 1 | Example 54 | Example 55 |
|---|---|---|---|
| Epoxy resin monomer (Molar ratio) | 828 | NEO | BUT |
| Amine curing agent | DDS | JER-113 | JER-113 |
| Heat transfer coefficient (W/mK) | 0.18 | 0.20 | 0.19 |
| Volume resistivity (Ω-cm) | $10^{16}$ | $10^{13}$ | $10^{14}$ |
| Breakdown voltage (KV/mil) | 2.5 | 1.7 | 1.8 |

As shown in Table 16, the thermally conductive material from the only one epoxy resin and the only one amine curing agent had low heat transfer coefficients.

Example 57

5 g of a combination of the aliphatic epoxy resin monomer NEO, the cycloaliphatic epoxy resin monomer YX8000, and the aromatic epoxy resin monomer YX4000 (molar ratio=5:1:4), 2.295 g of the cycloaliphatic amine curing agent JER-113, and 29.19 g of the high thermally conductive filler Al$_2$O$_3$ (occupying 80 wt % of the thermally conductive material) were evenly mixed, and then put into an oven at 150° C. for 1 hour to be cured for obtaining the thermally conductive material.

Example 58

Example 58 was similar to Example 57, and the difference in Example 58 was the amine curing agent being replaced with 1.148 g of the cycloaliphatic amine curing agent JER-113 and 1.771 g the aromatic amine curing agent BAPB (molar ratio=1:1). The other curing conditions in Example 58 were similar to those in Example 57.

Example 59

Example 59 was similar to Example 57, and the difference in Example 59 was the amine curing agent being replaced with 1.148 g of the cycloaliphatic amine curing agent JER-113 and 2.349 g the aromatic amine curing agent ELASMER 250P (molar ratio=1:1). The other curing conditions in Example 59 were similar to those in Example 57.

TABLE 17

|  | Example 57 | Example 58 | Example 59 |
|---|---|---|---|
| Epoxy resin monomer (Molar ratio) | NEO + YX8000 + YX4000 (5:1:4) | NEO + YX8000 + YX4000 (5:1:4) | NEO + YX8000 + YX4000 (5:1:4) |
| Amine curing agent (Molar ratio) | JER-113 | JER-113 + BAPB (1:1) | JER-113 + ELASMER 250P (1:1) |
| High thermally conductive filler (occupying ratio in the thermally conductive material) | $Al_2O_3$ (80 wt %) | $Al_2O_3$ (80 wt %) | $Al_2O_3$ (80 wt %) |
| Heat transfer coefficient (W/mK) | 5.5 | 5.9 | 6.5 |
| Volume resistivity (Ω-cm) | $10^{11}$ | $10^{11}$ | $10^{11}$ |
| Breakdown voltage (KV/mil) | 1.6 | 1.6 | 1.4 |

As shown in Table 17, the high thermally conductive filler could increase the heat transfer coefficients of the thermally conductive materials. On the other hand, the combinations of the cycloaliphatic amine curing agent and the aromatic amine curing agent could further increase the heat transfer coefficients of the thermally conductive materials.

Example 60

5 g of a combination of the aliphatic epoxy resin monomer BUT, the cycloaliphatic epoxy resin monomer YX8000, and the aromatic epoxy resin monomer YX4000 (molar ratio=5:1:4), 2.234 g of the cycloaliphatic amine curing agent JER-113, and 28.936 g of the high thermally conductive filler $Al_2O_3$ (occupying 80 wt % of the thermally conductive material) were evenly mixed, and then put into an oven at 150° C. for 1 hour to be cured for obtaining the thermally conductive material.

Example 61

Example 61 was similar to Example 60, and the difference in Example 61 was the amine curing agent being replaced with 1.117 g of the cycloaliphatic amine curing agent JER-113 and 1.724 g the aromatic amine curing agent BAPB (molar ratio=1:1). The other curing conditions in Example 61 were similar to those in Example 60.

Example 62

Example 62 was similar to Example 60, and the difference in Example 62 was the amine curing agent being replaced with 1.117 g of the cycloaliphatic amine curing agent JER-113 and 2.286 g the aromatic amine curing agent ELASMER 250P (molar ratio=1:1). The other curing conditions in Example 62 were similar to those in Example 60.

TABLE 18

|  | Example 60 | Example 61 | Example 62 |
|---|---|---|---|
| Epoxy resin monomer (Molar ratio) | BUT + YX8000 + YX4000 (5:1:4) | BUT + YX8000 + YX4000 (5:1:4) | BUT + + YX8000 + YX4000 (5:1:4) |
| Amine curing agent (Molar ratio) | JER-113 | JER-113 + BAPB (1:1) | JER-113 + ELASMER 250P (1:1) |
| High thermally conductive filler (occupying ratio in the thermally conductive material) | $Al_2O_3$ (80 wt %) | $Al_2O_3$ (80 wt %) | $Al_2O_3$ (80 wt %) |
| Heat transfer coefficient (W/mK) | 4.7 | 5.4 | 6.9 |
| Volume resistivity (Ω-cm) | $10^{11}$ | $10^{11}$ | $10^{11}$ |
| Breakdown voltage (KV/mil) | 1.6 | 1.6 | 1.3 |

As shown in Table 18, the high thermally conductive filler could increase the heat transfer coefficients of the thermally conductive materials. On the other hand, the combinations of the cycloaliphatic amine curing agent and the aromatic amine curing agent could further increase the heat transfer coefficients of the thermally conductive materials.

Example 63

5 g of a combination of the aliphatic epoxy resin monomer NEO, the cycloaliphatic epoxy resin monomer YX8000, and the aromatic epoxy resin monomer YX4000 (molar ratio=5:1:4), 1.148 g of the cycloaliphatic amine curing agent JER-113 and 2.349 g of the aromatic amine curing agent ELASMER 250P, and 56.865 g of the high thermally conductive filler $Al_2O_3$ (occupying 87 wt % of the thermally conductive material) were evenly mixed, and then put into an oven at 150° C. for 1 hour to be cured for obtaining the thermally conductive material.

Example 64

Example 64 was similar to Example 63, and the difference in Example 64 was the amount high thermally conductive filler $Al_2O_3$ being increased to 112.89 g (93 wt %). The other curing conditions in Example 64 were similar to those in Example 63.

Example 65

Example 65 was similar to Example 63, and the difference in Example 65 was the amount high thermally conductive filler $Al_2O_3$ being increased to 161.443 g (95 wt %). The other curing conditions in Example 65 were similar to those in Example 63.

TABLE 19

|  | Example 63 | Example 64 | Example 65 |
|---|---|---|---|
| Epoxy resin monomer (Molar ratio) | NEO + YX8000 + YX4000 (5:1:4) | NEO + YX8000 + YX4000 (5:1:4) | NEO + YX8000 + YX4000 (5:1:4) |
| Amine curing agent (Molar ratio) | JER-113 + ELASMER 250P (1:1) | JER-113 + ELASMER 250P (1:1) | JER-113 + ELASMER 250P (1:1) |
| High thermally conductive filler (occupying ratio in the thermally conductive material) | $Al_2O_3$ (87 wt %) | $Al_2O_3$ (93 wt %) | $Al_2O_3$ (95 wt %) |
| Heat transfer coefficient (W/mK) | 6.9 | 7.5 | 8.0 |
| Volume resistivity (Ω-cm) | $10^{12}$ | $10^{10}$ | $10^{10}$ |

TABLE 19-continued

|  | Example 63 | Example 64 | Example 65 |
|---|---|---|---|
| Breakdown voltage (KV/mil) | 1.0 | 0.8 | 0.7 |

As shown in Table 19, increasing the amounts of the high thermally conductive filler could increase the heat transfer coefficients of the thermally conductive materials.

Comparative Example 4

5 g of the aromatic epoxy resin monomer 828, 1.642 g of the aromatic amine curing agent DDS, and 26.568 g of the high thermally conductive filler $Al_2O_3$ (occupying 80 wt % of the thermally conductive material) were evenly mixed, and then put into an oven at 150° C. for 1 hour to be cured for obtaining the thermally conductive material.

TABLE 20

|  | Comparative Example 4 |
|---|---|
| Epoxy resin monomer | 828 |
| Amine curing agent | DDS |
| High thermally conductive filler (occupying ratio in the thermally conductive material) | $Al_2O_3$ (80 wt %) |
| Heat transfer coefficient (W/mK) | 3.5 |
| Volume resistivity (Ω-cm) | $10^8$ |
| Breakdown voltage (KV/mil) | 0.6 |

Comparative Example 5

Comparative Example 5 was similar to Example 29, and the difference in Comparative Example 5 was 5 g of the epoxy resin monomer being replaced with a combination of the aliphatic epoxy resin monomer BUT, the cycloaliphatic epoxy resin monomer YX8000, and the aromatic epoxy resin monomer YX4000 (molar ratio=8.9:0.1:1). The amine curing agent type and amount in Comparative Example 5 were similar to those in Example 29. Because the resin composition had an incompatible problem (e.g. phase separation), which was not further cured.

Comparative Example 6

Comparative Example 6 was similar to Example 29, and the difference in Comparative Example 6 was 5 g of the epoxy resin monomer being replaced with a combination of the aliphatic epoxy resin monomer BUT, the cycloaliphatic epoxy resin monomer YX8000, and the aromatic epoxy resin monomer YX4000 (molar ratio=0.5:1:1). The amine curing agent type and amount and the curing conditions in Comparative Example 6 were similar to those in Example 29. The cured resin composition was rigid, hard, brittle, and cracked, and its properties could not be measured.

TABLE 21

|  | Comparative Example 5 | Comparative Example 6 |
|---|---|---|
| Epoxy resin monomer (Molar ratio) | BUT + YX8000 + YX4000 (8.9:0.1:1) | BUT + YX8000 + YX4000 (0.5:1:1) |
| Amine curing agent | JER-113 | JER-113 |
| Heat transfer coefficient (W/mK) | Not available | Not available |
| Volume resistivity (Ω-cm) | Not available | Not available |
| Breakdown voltage (KV/mil) | Not available | Not available |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A resin composition, consisting of:
1 part by mole of (a) aromatic epoxy resin monomer;
0.25 to ⅔ part by mole of (b) cycloaliphatic epoxy resin monomer;
1.25 to 2 parts by mole of (c) aliphatic epoxy resin monomer;
optionally (d) amine curing agent; and
optionally (e) thermally conductive filler,
wherein the (a) aromatic epoxy resin monomer has a chemical structure of:

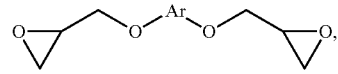

wherein Ar is

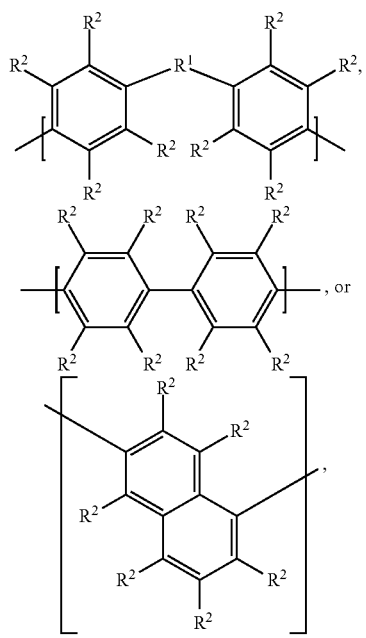

wherein $R^1$ is —$CH_2$—, —$C(CH_3)_2$—, —CH=CH—, —CH=C($CH_3$)—, —O—, —C≡C—, —C=CH—CO—, —COO—, —CONH—, or —CO—; and
each of $R^2$ is independently H, halogen, or $C_{1-8}$ alkyl group, wherein (b) cycloaliphatic epoxy resin monomer has a chemical structure of:

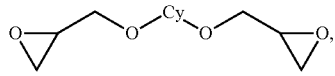

wherein Cy is

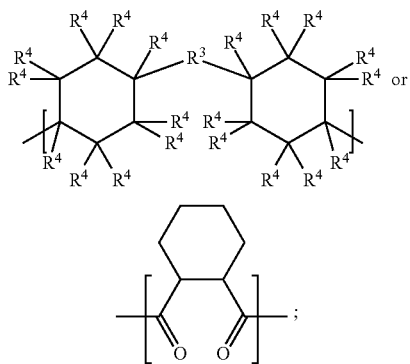

$R^3$ is —$CH_2$—, —$C(CH_3)_2$—, —CH=CH—, —CH=C(CH)—, —O—, —C≡C—, —C=CH—CO—, —COO—, —CONH—, or —CO—; and each of $R^4$ is independently H, halogen, or $C_{1-8}$ alkyl group, wherein (c) aliphatic epoxy resin monomer has a chemical structure of:

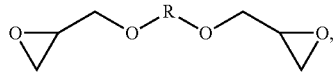

wherein R is $C_{1-6}$ linear alkylene group substituted by hydrogen or $C_{1-8}$ alkyl group.

2. The resin composition as claimed in claim 1, wherein (d) amine curing agent is present, and wherein epoxy groups of (a) aromatic epoxy resin monomer, (b) cycloaliphatic epoxy resin monomer, and (c) aliphatic epoxy resin monomer and amino groups of (d) amine curing agent have a molar ratio of 1:1 to 2:1.

3. The resin composition as claimed in claim 2, wherein (d) amine curing agent has a chemical structure of:

$H_2N$—$R^5$—$NH_2$ or $H_2N$—Ar'—O—$R^6$—O—Ar'—$NH_2$, wherein $R^5$ is

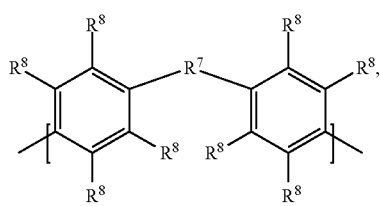

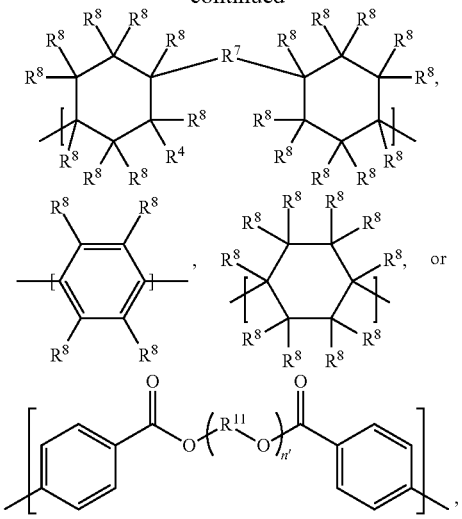

in which $R^{11}$ is $C_{1-6}$ alkylene group, and n'=1 to 10;

$R^7$ is single bond, —O—, —$SO_2$—, —$CH_2$—, —$(CH_2)_2$—, or —$C(CF_3)_2$—; and each of $R^8$ is independently H, halogen, or $C_{1-8}$ alkyl group;

wherein $R^6$ is

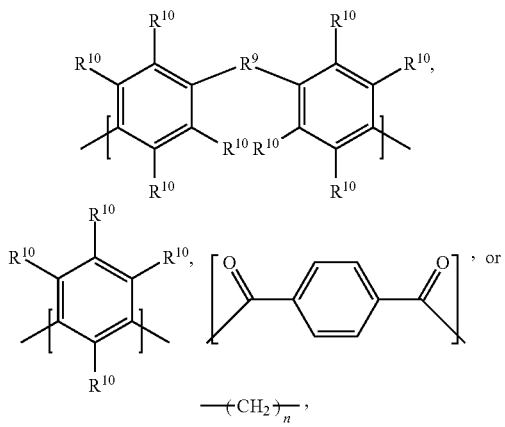

$R^9$ is single bond, —O—, —$SO_2$—, or —$C(CF_3)_2$—;

each of $R^{10}$ is independently H, halogen, or $C_{1-8}$ alkyl group;

n=3 to 12; and

Ar' is

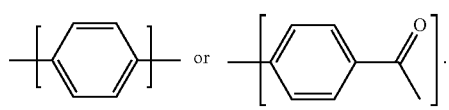

4. The resin composition as claimed in claim 2, wherein (d) amine curing agent includes a combination of a cycloaliphatic amine curing agent and an aromatic amine curing agent.

5. The resin composition as claimed in claim 1, wherein (e) thermally conductive filler is present, and wherein a total weight of (a) aromatic epoxy resin monomer, (b) cycloaliphatic epoxy resin monomer, and (c) aliphatic epoxy resin monomer and a weight of (e) thermally conductive filler have a ratio of 70:30 to 5:95.

6. The resin composition as claimed in claim 5, wherein (e) thermally conductive filler comprises metal, metal oxide, ceramic, carbon material, or a combination thereof.

7. A method for manufacturing a thermally conductive material, consisting of:
 mixing 1 part by mole of (a) aromatic epoxy resin monomer, 0.25 to ⅔ part by mole of (b) cycloaliphatic epoxy resin monomer, 1.25 to 2 parts by mole of (c) aliphatic epoxy resin monomer, optionally (d) amine curing agent, and optionally (e) thermally conductive filler to form a resin composition; and
 heating and curing the resin composition to form a thermally conductive material,
 wherein the (a) aromatic epoxy resin monomer has a chemical structure of:

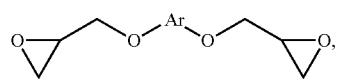

wherein Ar is

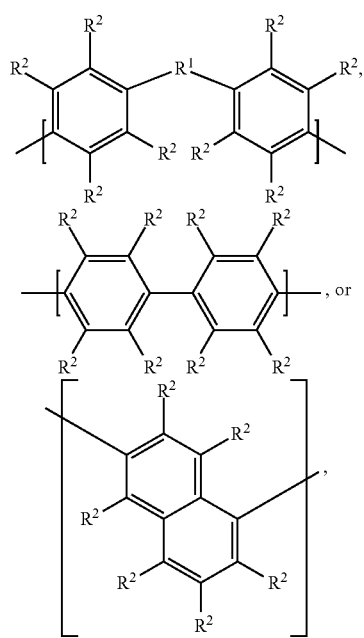

wherein $R^1$ is —$CH_2$—, —$C(CH_3)_2$—, —CH=CH—, —CH=C($CH_3$)—, —O—, —C≡C—, —C=CH—CO—, —COO—, —CONH—, or —CO—; and
each of $R^2$ is independently H, halogen, or $C_{1-8}$ alkyl group, wherein (b) cycloaliphatic epoxy resin monomer has a chemical structure of:

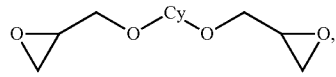

wherein Cy is

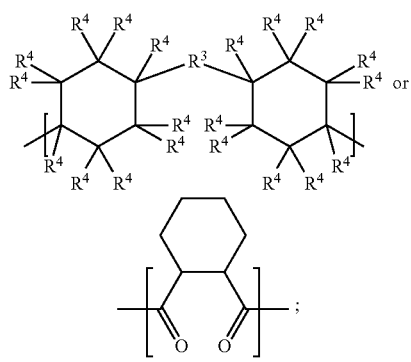

$R^3$ is —$CH_2$—, —$C(CH_3)_2$—, —CH=CH—, —CH=C($CH_3$)—, —O—, —C≡C—, —C=CH—CO—, —COO—, —CONH—, or —CO—; and
each of $R^4$ is independently H, halogen, or $C_{1-8}$ alkyl group,
wherein (c) aliphatic epoxy resin monomer has a chemical structure of:

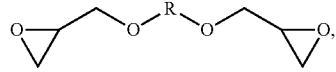

wherein R is $C_{1-6}$ linear alkylene group substituted by hydrogen or $C_{1-8}$ alkyl group.

8. The method as claimed in claim 7, wherein (d) amine curing agent is present, and wherein epoxy groups of (a) aromatic epoxy resin monomer, (b) cycloaliphatic epoxy resin monomer, and (c) aliphatic epoxy resin monomer and amino groups of (d) amine curing agent have a molar ratio of 1:1 to 2:1.

9. The method as claimed in claim 8, wherein (d) amine curing agent includes a combination of a cycloaliphatic amine curing agent and an aromatic amine curing agent.

10. The method as claimed in claim 7, wherein (e) thermally conductive filler is present, and wherein the total weight of (a) aromatic epoxy resin monomer, (b) cycloaliphatic epoxy resin monomer, and (c) aliphatic epoxy resin monomer and the weight of (e) thermally conductive filler have a ratio of 70:30 to 5:95.

* * * * *